United States Patent [19]

Lynnworth

[11] 4,103,551

[45] Aug. 1, 1978

[54] ULTRASONIC MEASURING SYSTEM FOR DIFFERING FLOW CONDITIONS

[75] Inventor: Lawrence C. Lynnworth, Waltham, Mass.

[73] Assignee: Panametrics, Inc., Waltham, Mass.

[21] Appl. No.: 763,939

[22] Filed: Jan. 31, 1977

[51] Int. Cl.² .............................................. G01F 1/66
[52] U.S. Cl. ................................................ 73/194 A
[58] Field of Search ..................................... 73/194 A

[56] References Cited

U.S. PATENT DOCUMENTS

| 3,940,985 | 3/1976 | Wyler | 73/194 A |
| 4,004,461 | 1/1977 | Lynnworth | 73/194 A |

OTHER PUBLICATIONS

R. C. Baker et al., "A Two Beam Ulrasonic Phase-Shift Flowmeter", Conference on Fluid Flow Measurement in the Mid 1970s; 8–10 Apr. 1975.

V. B. Pfau, "Optimization of the Test Section Length in Integrating Flow Measurement Methods", Feb. 1973.

*Primary Examiner*—Charles A. Ruehl
*Attorney, Agent, or Firm*—Kenway & Jenney

[57] ABSTRACT

A device for performing ultrasonic measurements on liquid flowing within a duct includes a pair of transducers communicating along an acoustic path within the duct. The acoustic path includes at least one midradius chord of the duct, the projection of that chord on a plane parallel thereto and including the duct axis being tilted with respect to the axis.

23 Claims, 22 Drawing Figures

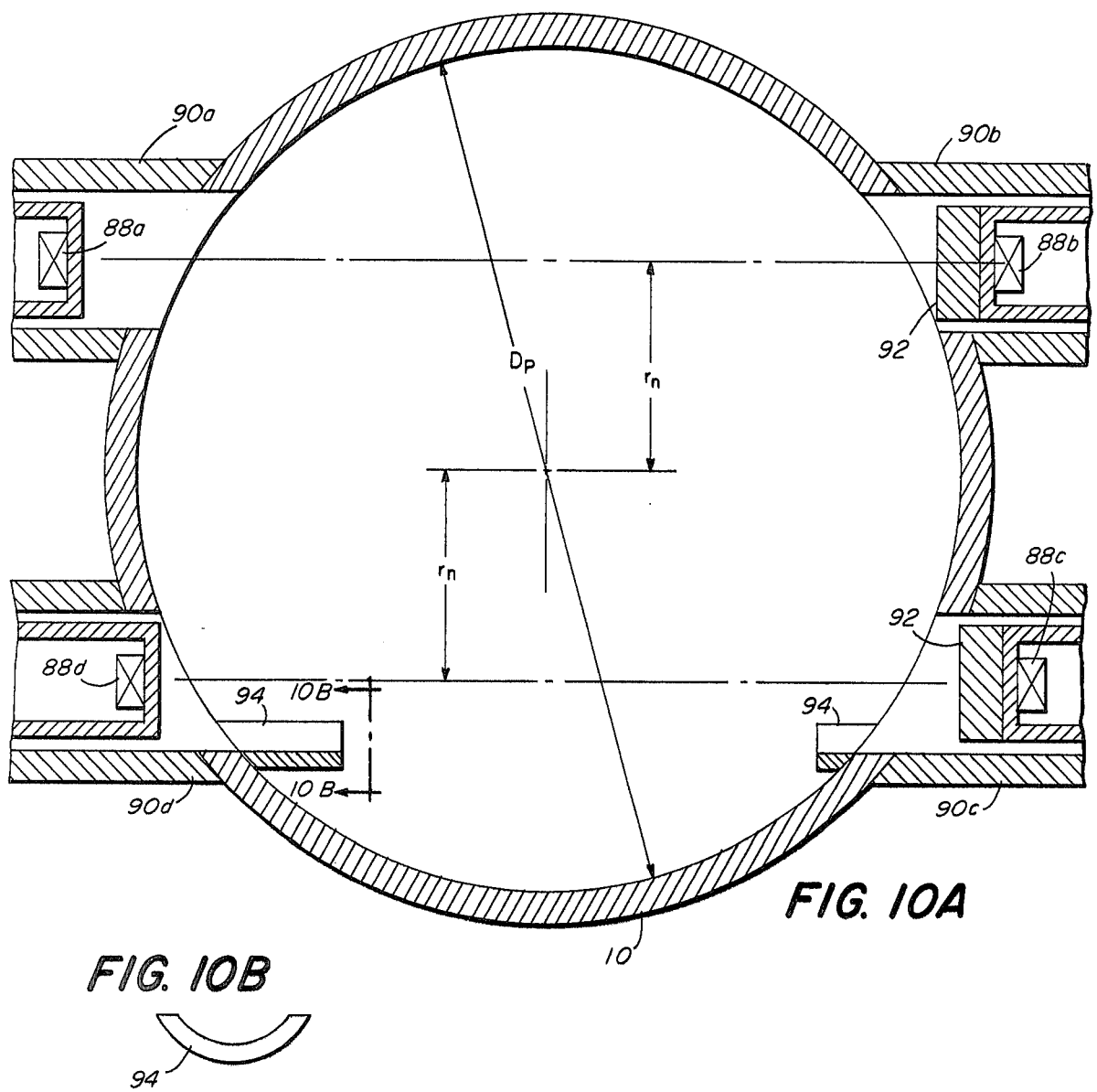
FIG. 10A
FIG. 10B
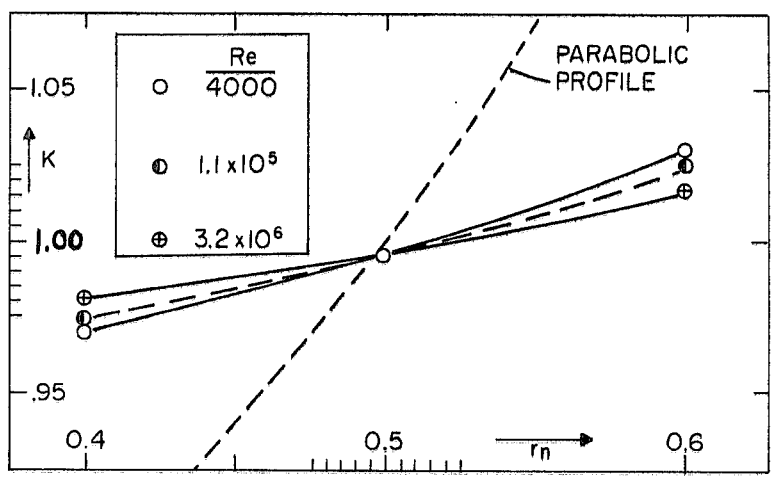
FIG. 2B

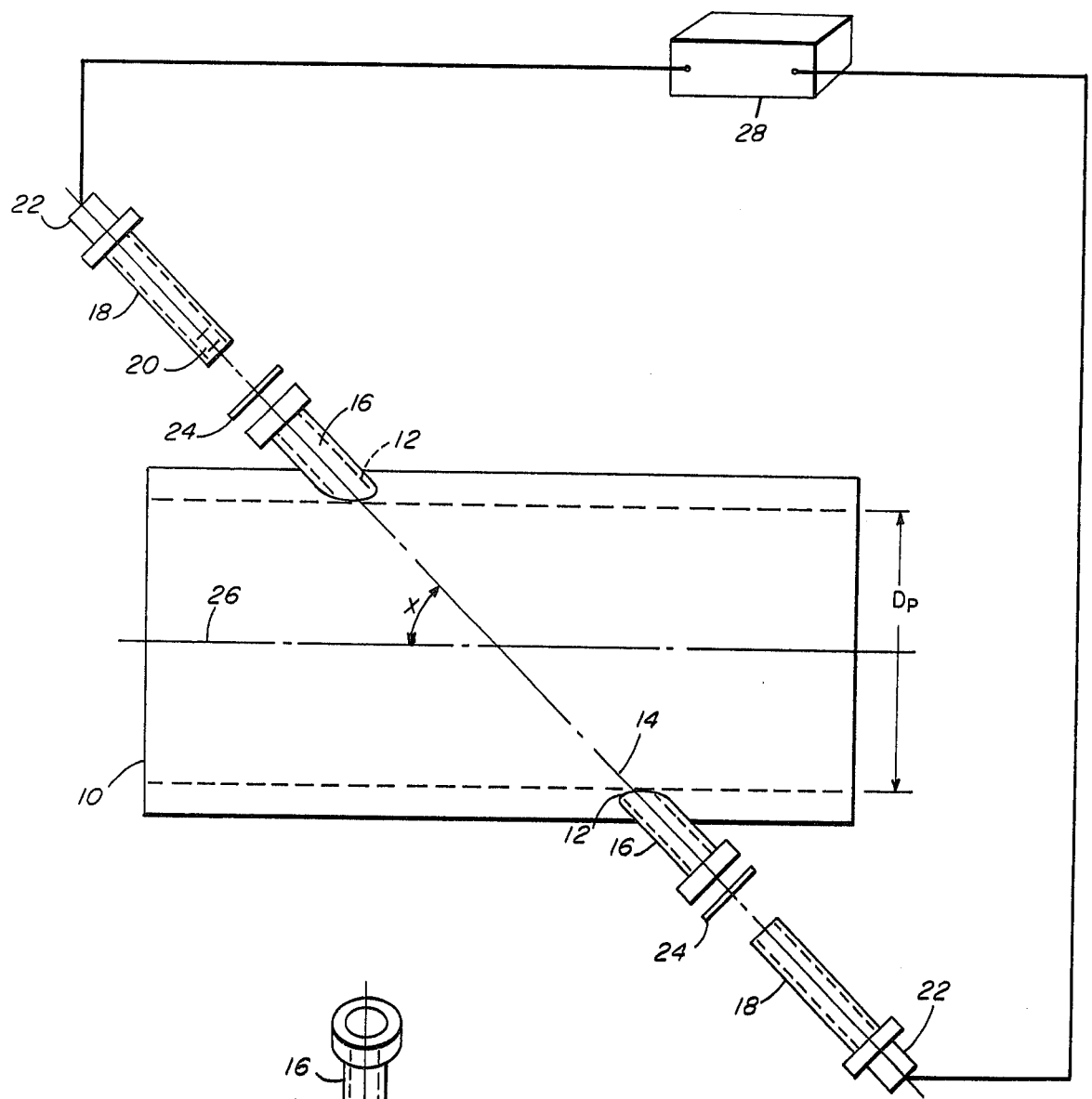
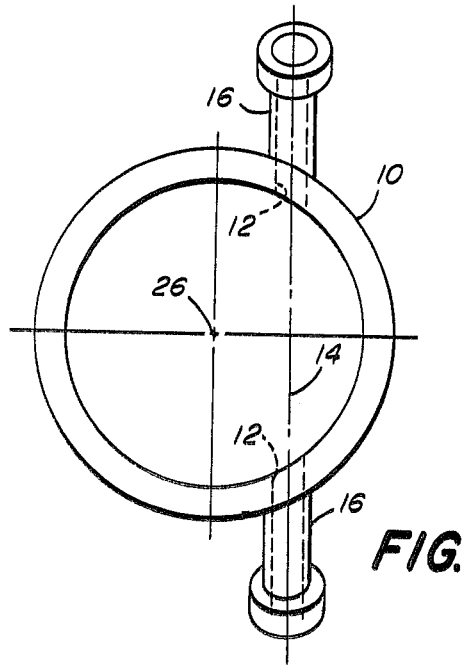
FIG. 4B
FIG. 4A

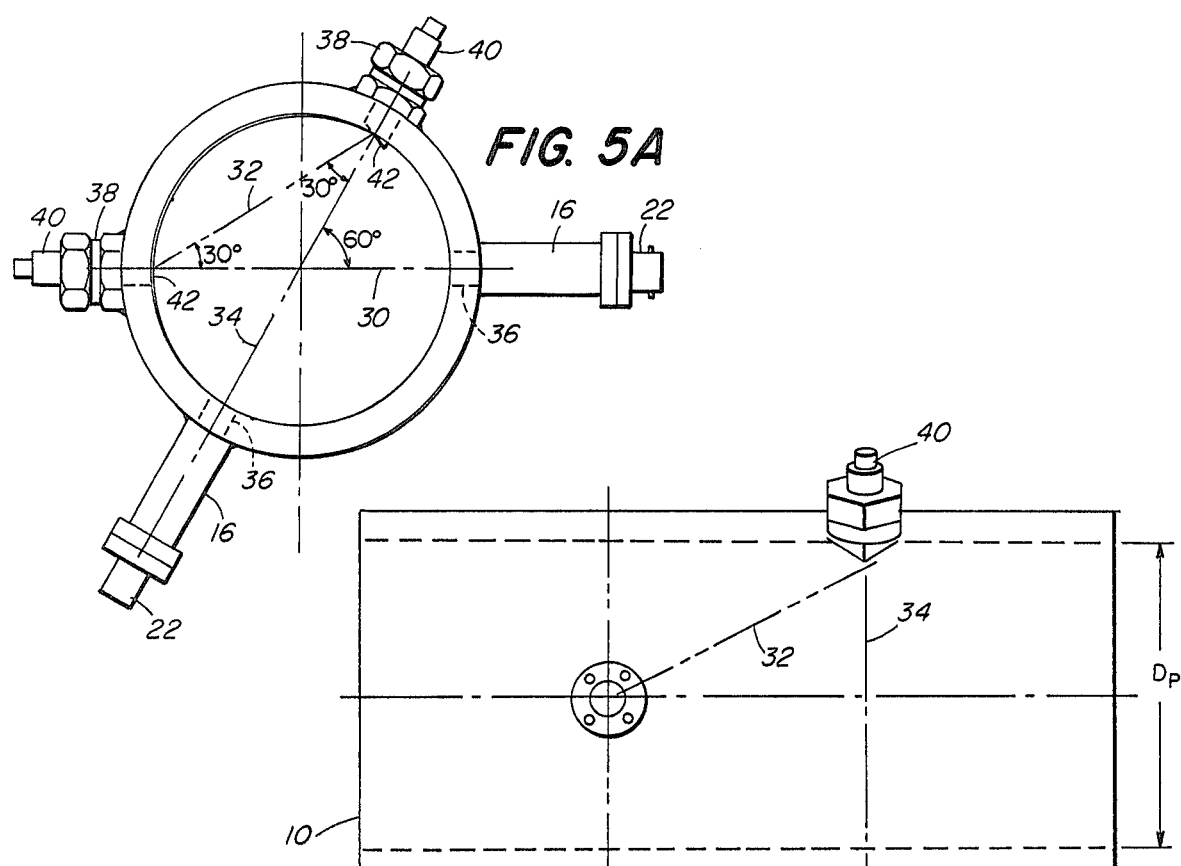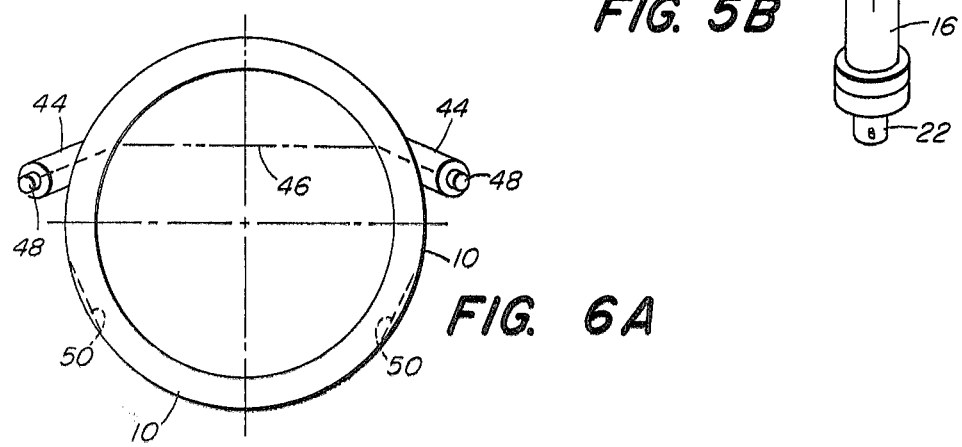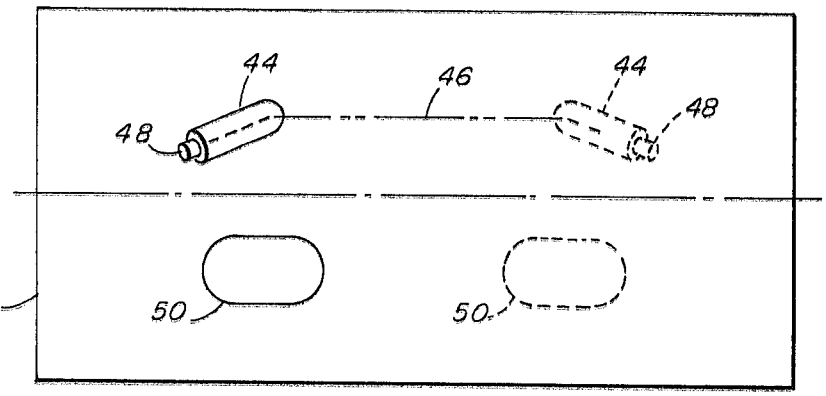

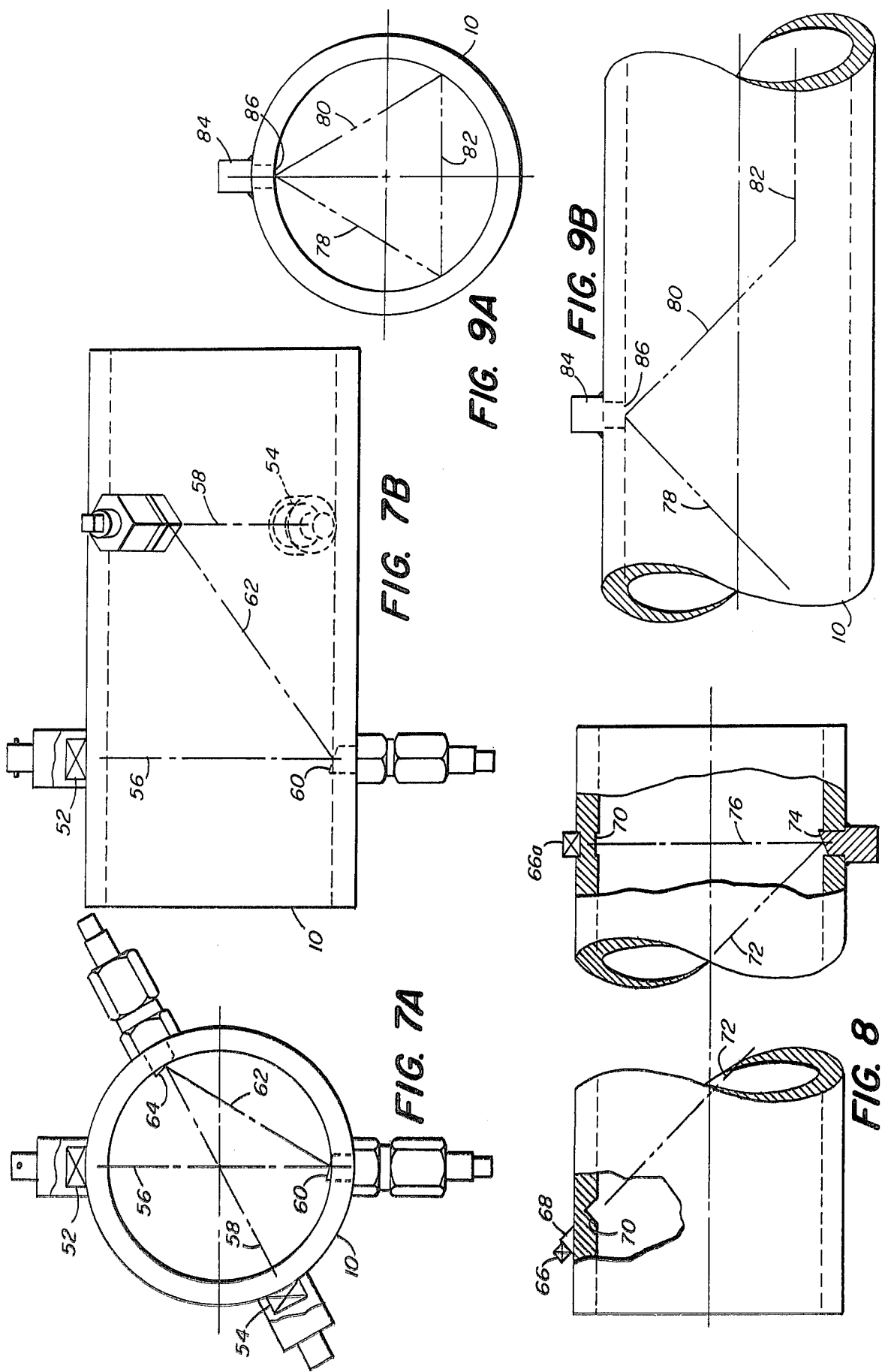

ULTRASONIC MEASURING SYSTEM FOR DIFFERING FLOW CONDITIONS

FIELD OF THE INVENTION

This invention relates in general to ultrasonic measurements of liquid flow within a conduit and more particularly to such a system having improved accuracy over a wide range of flow conditions.

BACKGROUND OF THE INVENTION

Utilization of ultrasonic measurements for the determination of various properties of a flowing material within an enclosed conduit is now a well developed art. A variety of techniques have been proposed for mounting ultrasonic transducers from the external or internal surfaces of the conduits and transmitting a generated beam through the fluid, receiving it at a second transducer, and measuring variations in transit time, (or its reciprocal which is proportional to sound speed c) or the attenuation of the signal. These ultrasonic parameters can be used to calculate flow characteristics, temperature, etc. of the fluid. Examples of such systems can be found in my prior U.S. Pat. No. 3,906,791, issued Sept. 23, 1975, and in my copending application Ser. No. 629,870, filed Nov. 7, 1975 and entitled "Ultrasonic Measuring Cell With Isolation Means" which will issue Jan. 25, 1977 as U.S. Pat. No. 4,004,461; each of which is assigned to the assignee hereof and is incorporated herein by reference.

The ultrasonic flow-sensing signal is typically emitted repeatedly or alternately from one of a pair of transducers mounted at opposite ends of a tilted diameter or diagonal across the conduit, with the direction of tilt being in the direction of flow of a material. The time delay difference (upstream time minus downstream time) between the generation of the emitted signals and their reception is a measure of the velocity of the flow. Other characteristics of the material may be determined by measurement of the attenuation of the received signal. In one embodiment a crossed pair of tilted paths are used with an emitting transducer and receiving transducer located at the ends of each of the crossed pairs. Techniques for measuring both the transit times and the attenuations are described in a number of patents and articles, some of which are listed in the above-mentioned Ser. No. 629,870.

Such previous techniques cannot provide sufficient accuracy for certain applications. The reason for the inaccuracy is that all the fluid in the pipe does not flow at the same velocity. Flow velocity at the wall is theoretically zero, while flow velocity on the pipe's axis is usually maximum. Between the wall and the axis, the velocity distribution depends on a number of factors such as Reynolds number, pipe roughness, inlet and outlet conditions, upstream conditions, vibration, temperature, density and viscosity distribution, etc. In many cases the principal factor influencing flow profile is the Reynolds number, Re. In these cases it has been the practice in the industry to multiply the meter reading by a factor K which is assumed to depend on Re alone. For an ultrasonic transmission measurement as described above, the meter factor K is defined by $K = \overline{V}/V_d$, where $V_d$ is the flow velocity measured along a tilted diameter. K typically varies from 0.750 for laminar flow (parabolic velocity distribution) to 0.93 to 0.96 for fully developed turbulent flows associated with Re = $10^4$ to $10^7$, respectively. The need for correcting $V_d$ by means of K was recognized over twenty years ago. A graph showing K vs Re was published in 1955 by Kritz, and in another form, by McShane in 1974. (J. Kritz, ISA Proc. 10 Part 2, 55-16-3, pp. 1-6 (1955); Instruments and Automation 28, 1912-1913 (Nov. 1955); J. L. McShane, pp. 897-913, in R. B. Dowdell, Ed. *Flow — Its Measurement and Control in Science and Industry*, ISA (1974).) Various attempts to improve upon the accuracy afforded by an ultrasonic transmission measurement along a single tilted diameter have been proposed. These include zig-zagging a wave down the pipe (Petermann, U.S. Pat. No. 2,874,568) or using orthogonal tilted diameters (N. Suzuki, H. Nakabori and M. Yamamoto, pp. 115-138, in C. G. Clayton, Ed., *Modern Developments in Flow Measurement*, Peregrinus Ltd. (1972)). These methods of multiple interrogation may provide some improvement in accuracy but they do not offer any fundamental or significant improvement because they weight the flow profile in essentially the same way as the single tilted diameter.

At the opposite extreme, ultrasonic methods have been demonstrated wherein the entire cross section of flowing fluid is weighted. In one of these methods the ultrasonic waves are transmitted axially (F. Noble, Rev. Sci. Instrum. 39(9) 1327-1331, Sept. 1968). In a second method waves are transmitted obliquely across a rectilinear duct, the waves themselves being enveloped by a square or rectangular pattern (Lynnworth, U.S. Pat. No. 3,906,791). These two methods have been practiced so far only in pipes of relatively small dimensions, and their application to large pipes would be difficult or impractical.

For large pipes the most accurate way to obtain $\overline{V}$ that has been demonstrated so far, using ultrasonic transmission methods, is the use of multiple chords, located and weighted according to mathematical formulas such as those derived by Gauss, Chebychef, or Lobatto (see U.S. Pat. No. 3,564,912, Feb. 23, 1971). This multiple chord approach provides high accuracy, but requires numerous ports to accommodate the multiple chords. Both the cost of fabrication and the risk of a leak in a pipe section, therefore, are larger than desirable.

A recent report suggests a single ultrasonic interrogation near the pipe midradius chord. (Baker and Thompson, "A Two Beam Ultrasonic Phase-Shift Flowmeter", Conf. on Fluid Flow Measurement in the Mid 1970's, Birniehill Institute, National Engineering Laboratory, East Kilbride, Glasgow, Scotland, 8-10 April 1975). That report, however, includes an experiment in air at 40kHz and a four inch diameter pipe. The resulting beam spread contributes to undesirably high levels of error (e.g. about ±5% total error estimated by Baker and Thompson).

OBJECTS AND SUMMARY OF THE INVENTION

In view of the above discussion, it is a principal object of the present invention to provide an arrangement capable of yielding accurate information about flow parameters over a range of flow conditions.

A more particular object is the provision of such an arrangement that can yield accurate data for both laminar and non-laminar flow.

Another object is the provision of such an arrangement that is easy and inexpensive to implement.

SUMMARY OF THE INVENTION

Briefly, the present invention features an ultrasonic flowmeter cell comprising a body having a circular cross section pipe segment having an inside diameter of $D_p$, and a pair of transducers mounted on the body and communicating with each other via a beam having an effective diameter, $d$, smaller than $D_p$. The body and transducers define an acoustic flow sensing path that includes at least one midradius chord of the duct segment. The projection of that chord on a reference plane parallel thereto and including the axis of the duct segment is inclined with respect to the duct axis. The transducers operate at a wavelength $\lambda$ that is substantially smaller than $d$. Preferably, $D_p/d$ is greater than approximately 8 and $\lambda$ is less than 0.036 $D_p \sin X$, where $X$ is the angle between the pipe's axis and the projection of the acoustic path.

In particular embodiments, the acoustic path may further include at least 1 diametral path segment, and/or three sequential path segments each being an oblique midradius chord.

DESCRIPTION OF THE DRAWINGS

In the drawings:

FIG. 2B is an enlarged view of a portion of the graph of FIG. 2A;

FIGS. 4A and 4B are end and side elevations of an ultrasonic flowmeter cell, and electronic measuring means, in accordance with the present invention;

FIGS. 5A and 5B are views similar to FIGS. 4A and 4B of an ultrasonic flowmeter cell that utilizes reflectors to reflect diametral beams obliquely along the midradius chord;

FIGS. 6A and 6B are views similar to FIGS. 4A and 4B of a flowmeter cell having an externally-mounted transducer used to interrogate flowing fluid along a midradius path, but without requiring mechanical penetration of the pipe or duct;

FIGS. 7A and 7B are end and side elevations, respectively, of a flowmeter cell combining the externally-mounted transducer with the diametral path reflector;

FIG. 8 is a side elevation, partly broken away, of a flowmeter cell having a hybrid externally-mounted transducer and internal non-refracting wedges, flats or cavities;

FIGS. 9A and 9B are end and side elevations, respectively of a flowmeter cell having a triple midradius path configuration wherein the axial projection of the three paths form an inscribed equilateral triangle;

FIG. 10A is a transverse section of a flowmeter cell illustrating various arrangements for controlling acoustic beam spread;

FIG. 10B is a view taken at 10B—10B of FIG. 10A; and

DETAILED DESCRIPTION

General

The present invention is grounded upon the discovery that there is a chord of a circular cross section duct along which the measured value of flow velocity will be an accurate measure of the average flow velocity, $\overline{V}$, over a wide range of flow profile distributions within the duct, if various system limitations are met. In particular, I have ascertained that the midradius chord of such a duct is a chord along which the line-integrated flow velocity $V_c$ is the average velocity, $\overline{V}$, for the case of laminar flow (parabolic profile) and is a very close approximation to $\overline{V}$ for turbulent flow.

Figure 1:
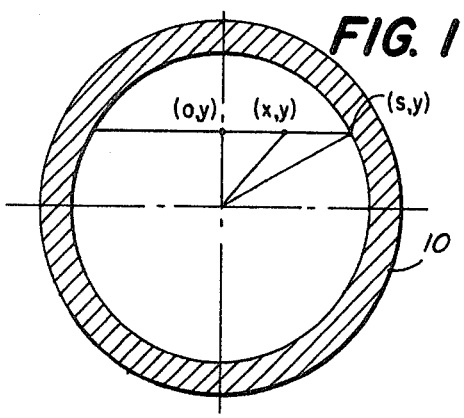
FIG. 1 is an end view of a circular duct of unit radius in which the flow is laminar, and including a chord of length 2s.
Figure 3A:
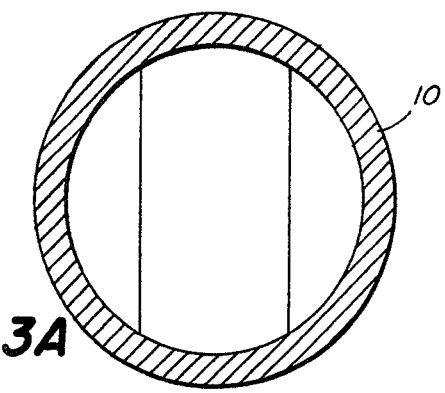
FIGS. 3A–D are end view of circular ducts containing the axial projections of multiple midradius chords, for 2, 3, 4 and 6 chords, respectively.
Figure 3B:
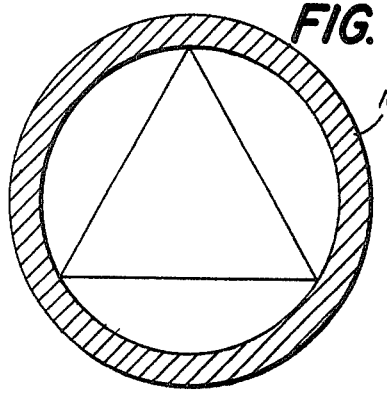
Figure 3C:
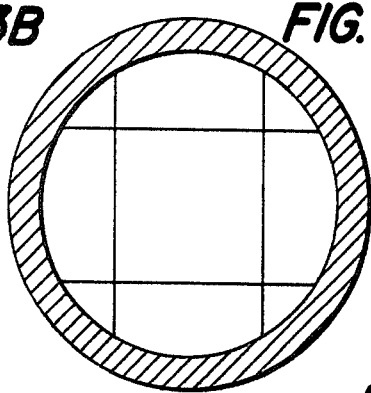
Figure 3D:
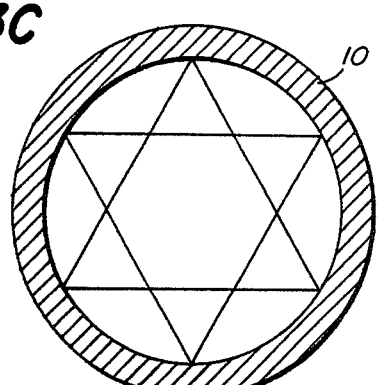

Referring to FIG. 1, which shows the end view of a circular pipe of unit radius in which the normalized flow distribution is parabolic: $v(r) = 1 - r^2$. The line-averaged flow along the chord is $$V_c = (\tfrac{1}{s}) \int_o^s v \, dx \tag{1}$$

where $v$ = flow velocity at the point $x$, $y$ and $s$ = semi-chord length. Noting that $r^2 = x^2 + y^2$, it follows from Eq. (1) that $$V_c = (\tfrac{1}{s}) \int_o^s [(1 - y^2) - x^2] dx \tag{2}$$

from which $$V_c = (\tfrac{2}{3})(1 - y^2). \tag{3}$$

Now for parabolic profile, the mean flow velocity in the same circular pipe of unit radius is $$\overline{V} = \pi \int_o^1 (1 - r^2) r \, dr \tag{4}$$

which integrates to $$\overline{V} = \tfrac{1}{2} \tag{5}$$

Equating $V_c$ using Eq. (3) and Eq. (5), one finds two roots, thereby locating the chords along which the line-average identically equals the area-average:

$$y = \pm 0.5 \tag{6}$$

These ordinates define the locations of the midradius chords.

Although this identification of the midradius chord as being appropriate for a parabolic profile is interesting, absent my further findings it would not be crucial since the line-averaged velocity $V_c$ along any chord could easily be corrected using the correction factor $K = \overline{V}/V_c = (\tfrac{3}{2})/(1-y^2)$ to give $\overline{V}$ for the parabolic profile case. At the midradius chord $K = 1$.

The velocity distribution for nonlaminar flows corresponding to Reynolds numbers (Re) from 4000 to 3.2 × 10⁶ were accurately measured about 50 years ago (J. Nikuradse, Untersuchung über die Geschwindigkeitsverteilung der turbulenten Strömung in glatten Rohren, VDI-Forschungsheft 356, Berlin NW7 (1932).) Using that measured data I have calculated the value of $K = \overline{V}/V_c$ for various values of Re along various chords of a circular cross section duct. (This calculation involved dividing the duct into ten concentric equi-distant annuli and then using a numerical integration procedure along the various chords.) The results are plotted in FIG. 2 in a graph of K vs. chord location for three different values of Re that result in nonlaminar flow, as well as for laminar flow (Re less than ~2000). The unexpected result is that K is substantially unity at a value of 0.5 of the normalized radius, $r_n$, over this wide range of Re that includes both laminar and nonlaminar flow. The span of Reynolds numbers includes most cases of nonlaminar flow of interest in industry and, therefore, the midradius chord is a uniquely desirable location along which to determine line-averaged flow velocity.

By utilizing the midradius chord, one can obtain a reasonably accurate measure of $\overline{V}$ for both laminar and turbulent flows without the need for explicitly determining Re. This avoids the need to measure or compute the fluid-property terms that contribute to Re, namely, density $\rho$ and viscosity $\eta$. Since density and viscosity depend on fluid composition and temperature, it will be recognized that immunity to Re means that a midradius flowmeter can be much more tolerant of changes in a fluid's composition or temperature. That is to say, as long as the profile is laminar or turbulent, it is basically not necessary to take composition or temperature into account, in determining $\overline{V}$. Thus, a simpler, more reliable, less expensive flowmeter results from using measurement paths along the midradius chord.

The advantages of measuring along the midradius chord are especially important when conditions of flow are such that the transitional region between laminar and turbulent flow is encountered. As a practical matter, since transitional flow is unstable and therefore unpredictable, neither tilted diameter nor midradius flowmeters can provide guaranteed accuracy in this regime. The flowmeter user is therefore advised to avoid transitional flow. However, it is not always possible to measure, control, or know Re, nor to avoid transitional flow. Further, knowledge of Re is not always sufficient to define whether the profile is laminar or turbulent. In view of these considerations, it will be understood that the advantages of the midradius become increasingly significant when one encounters both laminar and turbulent distributions, when it is not known whether flow is laminar or turbulent, and/or when Re varies over wide ranges.

Figure 2A:
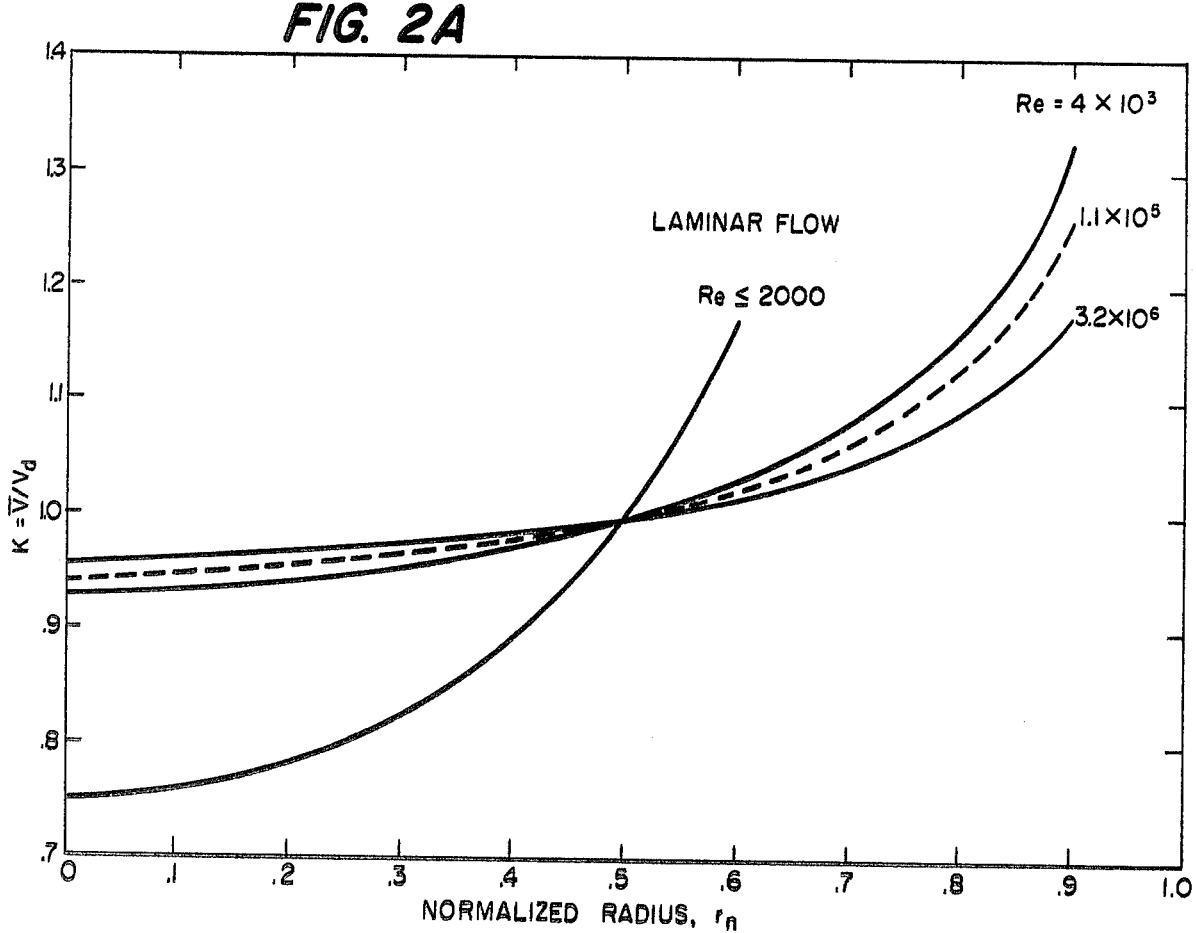
FIG. 2A is a plot of K vs $r_n$ for the parabolic and turbulent profiles in a duct such as shown in FIG. 1.

Referring again to the K vs normalized radius graph in FIG. 2, we note that in addition to the common midradius intersections near $K = 1$, each curve exhibits an approximate symmetry about this intersection point, provided the excursions from $r_n = 0.5$ are not too large, say up to ±0.1. Symmetry about the midradius intersection, even if limited to small excursions, is of considerable practical importance. Since any practical flowmeter utilizes a sound beam of finite width, it will be understood that even with a relatively narrow beam centered on the midradius, some sampling or weighting of the flow occurs on either side of the midradius. To the extent that the K function is symmetrical about the midradius, adjacent portions of the beam lying on either side of the midradius, say at $r_n = 0.5 \pm \epsilon$ (where $\epsilon << r_n$) contribute K's approximately equal to $1 \pm \delta$, respectively (where $\delta << 1$). These bipolar $\delta$ contributions tend to cancel, although cancellation will never be perfect. Nevertheless, by interrogating with a beam whose "effective" diameter $d_e$ is small compared to the pipe inside diameter $D_p (d_e << D_p)$, centering this beam substantially on the midradius enables one to measure the area-averaged flow velocity of Newtonian fluids to high precision and an accuracy on the order of 1%, without correcting for flow profile in any way, for flow distributions which are laminar or turbulent. (For simplicity of explanation, the term "average diameter" shall be used to denote the mean of major and minor diameters for elliptical or rectangular transducers, or the mean diameter of unequal circular pairs or irregularly-bounded transducers.)

As is well known, ultrasonic beams in fluids spread according to certain laws. The Fresnel or near field is often considered to be confined to distances from the transducer up to $d^2/4\lambda$ where $d$ = transducer diameter and $\lambda$ = wavelength in the fluid. Near field diffraction or beam spread is relatively small, the diffraction loss at the distance $z = d^2/4\lambda$ being ~1.85 dB. At the Fraunhofer or far field distance $d^2/\lambda$, the beam spread loss is approximately 3.85 dB.

The midradius path length depends on the pipe diameter and the beam angle. If the beam's projection (FIG. 1) makes an angle of 45° with the pipe axis, the midradius path $P = \sqrt{6}D_p/2 = 1.225D_p$. If one desires to minimize beam spread over the path P, one can equate P with $d^2/4\lambda$, resulting in $\lambda = d^2/4P$. Since $\lambda = c/f$ where $c$ = sound speed in the fluid and $f$ = frequency of the ultrasonic wave, knowledge of $c$ and the pipe dimensions enables one to select $f$. As long as the beam is not excessively absorbed or scattered at this $f$, the measurement may be conducted at this $f$. For example, consider a circular duct, $D_p$ = 10 inches (25.4 cm), transducer diameter $d$ = 1 inch (2.54 cm), the fluid being dry air at normal temperature and pressure, of sound speed $c \approx 0.012$ in/$\mu$s (~300 m/s). Here, P ≈ 12 inches (≈30 cm), and solving for frequency, one finds $f \approx 0.6$ MHz. Now the sound absorption coefficient $\alpha$ in dry air at 0.6 MHz is about 1 dB/inch, or ~12 dB over the 12 inch path P, which is not an unreasonably large absorption. For the same dimensions, to maintain the same beam spread despite substitution of water for air requires an increase in $f$ by the ratio $c_{water}/c_{air}$, this ratio being about 5:1. In other words, by setting the 45° midradius path P equal to the near field distance $d^2/4\lambda$, one finds $f = (4.9 \, c/d)(D_p/d)$.

Since absorption and scattering losses may be much more important than beam spread losses, the above values for $f$ may need to be compromised in favor of smaller $f$'s. Dividing $f$ by 4 means that the receiver transducer effectively "moves" from a near field location to a far field location (from $d^2/4\lambda$ to $d^2/\lambda$). The increased diffraction loss accompanying this "move" is ~2dB, not an unreasonable penalty to be traded for reducing the absorption coefficient by typically a factor of $(f_1/f_2)^2$ or 16. For example, reducing frequency from $f_1 = 1$ MHz to $f_2 = 0.25$ MHz would reduce $\alpha$ in air from about ~4dB/inch to ~¼ dB/inch. In a 12 inch path this means a reduction in absorption loss of ~45 dB, in exchange for the relatively small beam spread penalty of 2 dB.

It will be understood that flow measurements can be conducted in the far field over path lengths considerably in excess of $d^2/\lambda$. Cases where P > $10d^2/\lambda$ are not unusual. By operating each transducer in the far field of the other transducer, the beam spread associated with this large a distance assures that undesired multiple reverberations between transducers, commonly called "triple transits", will be suppressed.

Clearly, the acoustic propagation properties of the fluid may dictate an $f$ that, combined with $D_p$ and $d$, exposes the receiver transducer to far field conditions. Usually, at the far field distance $d^2/\lambda$, even though the beam width between half power points is approximately $2d$, if the receiver transducer diameter also equals $d$, then the influence of flow outside the cylindrical envelope containing the transducer may be disregarded. Hence the "effective" beam diameter equals the common transducer diameter $d$. So long as $d << D_p$, and the beam is substantially centered on the oblique midradius chord, the average flow velocity is obtained using $K = 1$.

The common practice will be to have both transmitter and receiver transducers of the same diameter $d$. However, should they be unequal, then $d$ shall be interpreted as the average transducer diameter. Reference to FIG. 2 shows that it will be desirable to keep $d$ small compared to $D_p$. The departures from $K = 1$ become increasingly asymmetrical as the transducer diameter $d$ includes $r_n$'s outside $0.5 \pm 0.1$.

To give some further specific examples of transducer or beam size relative to pipe size, it may be expected that for pipes from ~1 ft to several feet in diameter (~0.3 to ~1 m) transducer diameters may range from 0.5 in. to 1.0 inch (~1.27cm to ~2.54cm). These sizes result, first of all, from the desire to keep $d << D_p$ so that K does not depart significantly from unity. In addition, for the cases where the pipe is to be drilled to create transducer ports, one wants to keep these ports as small as possible, to minimize flow disturbances. Even for larger pipes, say of diameter $D_p = 4$ to 8 ft, there are additional motivations for keeping $d$ small not only on a relative basis, but on an absolute basis. For reasons of safety and economy, it will usually be desirable to keep transducer port diameters under 2 inches ($\leq 5$ cm). Where 4-ft. diameter pipes can utilize $\frac{1}{2}$ inch diameter transducers, or 8-ft. pipes can use 1 inch transducers, the ratio $D_p/d$ will be essentially 100:1.

Near the opposite extreme of pipe sizes, say 1 inch or 2 inch diameters (~2.5 to 5 cm) it will often be convenient to utilize standard sizes of commercially available transducers. Typical small transducer diameters would be $\frac{1}{8}$ or $\frac{1}{4}$ inch (transducers part Nos. V316 and V310, respectively, Panametrics, Inc., Waltham, Massachusetts). Here the radio $D_p/d = 8$.

To be consistent with the motivation for requiring $d << D_p$, one wants to be sure that the measurement is not influenced significantly by beam/fluid interactions over spurious paths such as reflections off the duct walls or off scatterers lying outside the intended midradius interrogation path. Adequate beam directivity is obtained if the far field begins at a distance not less than $P/2$ from the transmitting transducer, where $P = \sqrt{3} D_p/2 \sin X$ and X is the angle between the projected beam axis and the duct axis (see FIG. 4B, for example). The angle X may be designed to take on values from about 15° to about 75° for various reasons (e.g., larger angles may be best for clamp-on units employing a longitudinal incident mode while small angles may give higher sensitivity to flow in small siameter pipes).

As a function of X, $d$ and $D_p$, control of the beam spread requires constraints on the maximum wavelength $\lambda$. Thus if P is the oblique path in the midradius plane, $D_p = 2$ is the inside diameter of the pipe of unit radius, and $\lambda_1$, $\lambda_2$ and $\lambda_3$ are maximum values calculated for the largest $d$ defined by this invention (namely, $d = D_p/8$) three related but different specifications on allowed beam spread emerge. These constraints on $\lambda$ may be succintly expressed as follows. If the largest allowable $d$ equals $D_p/8$, and if the largest allowable beam spread corresponds to far field conditions at the midpoint of P, then the largest allowable wavelength is:

$$\lambda_{max} = \frac{D_p \sin X}{16 \sqrt{3}} = 0.036 \, D_p \sin X$$

(For broadband pulses, $\lambda$ is interpreted as the wavelength at the center frequency.)

From FIG. 2B, it is seen that for turbulent cases only (Re = $4 \times 10^3$ to $3.2 \times 10^6$), K changes by 1% or less for $r_n$ from 0.47 to 0.54 ($\epsilon \sim 0.1 \, r_n$). But to include both laminar and turbulent cases, K changes by more than 1% unless $r_n$ lies between about 0.49 and 0.51 ($\epsilon \sim 0.02 \, r_n$). Taking into account the tolerances in machining and assembly, and the wide range of $D_p$ to be encountered, and certain refinements associated with configurations preferred for higher accuracy, to be defined later, we may interpret the phrase "substantially centered" to mean $0.1 \geq \epsilon/r_n \geq 0.001$.

Numerical values corresponding to the above constraints are illustrated in Table I below, for two duct diameters and two common fluids.

Table I

| | | Examples of $\epsilon$, d, $\lambda$ and f in accordance with representative constraints | | | |
|---|---|---|---|---|---|
| Type of Constraint | Symbol/ Value | $D_p = 10$ cm | | $D_p = 100$ cm | |
| | | Air | Water | Air | Water |
| Geometry/ Symmetry | $\epsilon/r_n \leq .01$ | $\epsilon \leq 0.25$ mm | 0.25mm | 2.5mm | 2.5mm |
| | $\epsilon/r_n \leq .001$ | $\epsilon \leq 0.025$mm | 0.025mm | 0.25mm | 0.25mm |
| Beam Diam | *$D_p/d \geq 8$ | $d \leq 12.5$mm | 12.5mm | 125mm | 125mm |
| | **$D_p/d = 100$ | $d = 1$mm | 1mm | 10mm | 10mm |
| Wavelength | *$d/\lambda \geq 4$ | $\lambda \leq 3.1$mm | 3.1mm | 31mm | 31mm |
| | ** | $\lambda = 0.25$mm | 0.25mm | 2.5mm | 2.5mm |
| Frequency | *$f \geq c/\lambda$ | $f \geq \sim 10^5$Hz | $\sim 5 \times 10^5$Hz | $\sim 10^4$Hz | $\sim 5 \times 10^4$Hz |
| | ** | $f = 1.2$MHz | 6MHz | $1.2 \times 10^6$Hz | $6 \times 10^5$Hz |

*, ** corresponding conditions. $c_{air} = 300$ m/s, $c_{water} = 1500$ m/s.

Having illustrated various constraints by numerical example, it is now convenient to examine the K vs $r_n$ curves near $r_n = 0.5$. Again, the values of K listed below in Table II were computed by numerical integration of values read from Nikuradse's graph. (Comparison of these values with interpolated values from Nikuradse's actual measured data, shows agreement averaging better than 0.2% of point.)

Table II

| | | K | |
|---|---|---|---|
| $r_n$ | Re = 4000 | $1.1 \times 10^5$ | $3.2 \times 10^6$ |
| .4 | .9706 | .9748 | .9818 |
| .5 | .9959 | .9961 | .9964 |
| .6 | 1.031 | 1.025 | 1.017 |

These K's are plotted in expanded scale in FIG. 2B. Several details are now seen more easily. For example, the three curves for turbulent Re's yield an average not equal to unity, but rather 0.9961, at $r_n = 0.5$. Second, for turbulent Re's the curves intersect $K = 1$ at $r_n$ between about 0.510 and 0.525. Third, the K curve for parabolic profile intersects $K = 0.996$ at $r_n = 0.497$. From these observations, based upon a graph of Nikuradse's actual data (rather than upon a mathematical approximation to these data) certain preferred embodiments of the nominally "midradius" flowmeter may be designed in order to refine the accuracy of the device over the nominal $r_n = 0.5$, $K = 1$ combination. Preferred values of $r_n$ and K are tabulated below (Table III).

Table III

| Type of Flow | $r_n$ | K |
|---|---|---|
| Turbulent only | 0.500 | .9961 |
| Turbulent only | 0.520 | 1.0000 |
| Laminar or Turbulent | 0.497 | .9960 |
| Laminar or Turbulent | 0.500 | .9980 |

To achieve accuracy of 1% or better, the present invention encompasses constraints on transducer diameter ($d = \frac{1}{8}$ to $1/100\ D_p$) and on wavelength $[\lambda < (D_p \sin X)/16 \sqrt{3}]$. These constraints are motivated by the hydrodynamic-related K symmetry for small excursions about $r_n = \frac{1}{2}$; by the diameters of transducers having practical combinations of diameter and frequency; by safety considerations; and by beam spread and angle considerations.

In general, then, this invention will be practiced using a relatively narrow, obliquely interrogating beam of short wavelength ($\lambda << d$) centered substantially on the midradius, and with the effective portion of this beam defined by a transducer diameter $d$ which is smaller than the pipe diameter $D_p$ by a factor in the range of about 8 to 100. Thus the transducers communicate via an effectively narrow beam of ultrasound that interacts with the axial components of fluid flow over at least a portion of the acoustic path.

The present invention can also benefit by the use of multiple tilted midradius chords (known per se), where the multiplicity (usually 2) of such chords sample a greater volume, and therefore provide a more representative reading of the fluid, with improved immunity to swirl in some cases.

Illustrated Embodiments

As suggested above, the use of multiple transmissions along midradius chords can be employed to achieve high accuracy of measurements. FIGS. 3A-3D illustrate multi-midradius chords projected in the axial direction for, respectively, the cases of 2, 3, 4, and 6 chords. A particularly desirable configuration is the three chord case of FIG. 3B. Here, each axial projection of a midradius chord forms one leg of an inscribed equilateral triangle within the circular cross section duct. Thus, a midradius interrogation beam could be doubly reflected so as to sample, in zig-zag fashion, about three times the representative fluid as would a single midradius interrogation. An embodiment adopting this approach is illustrated in FIGS. 9A and 9B and is discussed further below.

FIGS. 4A and 4B illustrate a midradius flowmeter cell and transducers wherein direct oblique transmission is utilized. The flow cell body is principally a section 10 of duct pipe which may be circumferentially butt welded at each end when installed in a pipeline, or it may be threaded or flanged at each end and installed as a spoolpiece. The section 10 preferably has hydraulically smooth interior walls. The section 10 contains two ports 12 centered on a midradius chord 14. The two ports may be elongated by the addition of flanged tubes 16. These flanged tubes in turn mate with any of a variety of transducer holders, one of which is illustrated at 18. Normally a pair of matched holders will be used. Holder 18 houses an electro-acoustic transducer 20 which is typically a piezoelectric disc. The transducer is energized electrically via connections from connector 22. Gasket 24 is usually installed between holder 18 and flanged tube 16 to seal the assembly, and to provide a degree of acoustical isolation as may be required in some applications. When the transducer is energized, it emits a beam of ultrasonic energy through the window at the wetted end of the holder. The beam proceeds along the midradius chord, which is inclined obliquely to the pipe axis 26 at a projected angle X (typically 45°). A similar holder, transducer and connector assembly on the opposite end of the acoustic path receives the beam, and by means of suitable electronic timing and signal processing equipment 28, the communicated transmit time is measured, usually to an accuracy in the nanosecond to microsecond range. For clarity, FIG. 4B shows the holders 18 in a generally exploded view. In practice, of course, the holder is installed and sealed into flanged tube 16 using bolts and nuts, encircling clamps or similar conventional fastening means.

By transmitting simultaneously or alternately in both directions, and measuring transit time intervals, or quantities related thereto, $V_c$ is obtained. This is equated to $\overline{V}$ since the particular chord in use is the midradius chord, i.e., K is substantially unity.

In cases where the fluid does not exhibit an unusually high attenuation coefficient, and where beam spread is not excessive, it will often be possible to avoid some of the cost and inconvenience of obliquely drilling ports of the type shown in FIGS. 4A-4B, by instead drilling radial ports through which the beam may be introduced along a diametral path. FIGS. 5A-5B illustrate this arrangement. A diametral beam 30 is reflected again along an oblique, midradius flow-sensing chord 32 and then may be reflected again along a second diametral path 34. The 30° and 60° angles between the axial projections of beams and centerlines are shown in FIG. 5A. Diametral ports 36 accept the transducer holders 16. Compression fittings 38 may be used to orient and hold reflectors 40 whose wetted ends 42 are compoundangled to reflect the wave incident from a diametral path along a flow-sensing oblique midradius chord 32 at a projected angle such as 45° or vice versa.

Another type of cell and transducer configuration is shown in FIGS. 6A and 6B. Commonly called the clamp-on, but more properly or more generally denoted the externally-mounted type, this design avoids any mechanical penetration of the duct or pipe section 10. A pair of compound-angled external wedges 44 are coupled to the duct 10 and contoured or angled to provide an obliquely refracted beam centered on a midradius chord 46 between transducers 48. (To avoid the need to contour the wedge, the pipe may be filed or milled to produce small flats 50 at the desired locations for these externally mounted wedges.) The transducers 48 may be shear mode, as described in my U.S. Pat. No. 3,575,050 or they may be longitudinal mode as in conventional angle beam transducers for nondestructive testing. The angle of the wedge is compound, in the sense that, according to Snell's Law, the beam in general will be tilted in a first plane (as seen in the end view of FIG. 6A) so that the refracted beam is substantially centered on the midradius chord 46, and then tilted in a second plane (as seen in the side view of FIG. 6B) to provide an oblique flow-sensing interrogation of the fluid in the circular duct.

With reference to FIGS. 6A and 6B, it is not immediately obvious whether the required compound angle refraction is in fact generally achievable in practice. It is also not immediately obvious, even for realizeable configurations, which structures are optimum. Consider, for example, that in the end view, FIG. 6A, the midradius refracted angle must be 30°. If the speed of sound in the pipe wall exceeds twice that in the fluid, the refracted angle will be less than 30°, according to Snell's Law, voiding the midradius possibility. (Similarly, in the side view, FIG. 6B, if one wants the oblique path to be inclined at the refracted angle of, say, 45°, this can be obtained only if the velocity ratio $C_{pipe}/C_{fluid}$ does not exceed $\sqrt{2}$.) Sound speed data for solids, liquids, and gases leads one to conclude that if the wave incident in the unpenetrated circular pipe is in the longitudinal (L) mode, midradius interrogation is not possible for any ordinary fluid in any ordinary metal, glass or ceramic pipe. (Water in plastic pipe or ATJ graphite pipe, however, are examples of viable L mode combinations of ordinary materials.)

To extend the applicability of midradius interrogations beyond those allowed by L mode refraction possibilities, I have analyzed an obliquely incident compound angle shear mode, specifically for nonpenetrating midradius interrogation of commonly available pipe/fluid materials combinations. Consideration first of Snell's Law, and second of the more complicated equations for energy transmission at oblique incidence, shows that the use of the shear mode extends the midradius clamp-on applicability to combinations such as glycerine/aluminum, the jet fuel JP-4 at −60° C/stainless steel 304, water/copper, water/brass, water/bronze, water/monel, water/tungsten, certain salt water or hot water (∼90° C) in pipes of nickel or stainless steel 410, hot helium or hydrogen in copper, etc.

Having established the greater versatility of shear mode in the pipe, there remains the choice of generating this mode from a transducer vibrating in the L or S mode. The L transducer mode conversion method is a compound angle version of that commonly employed in nondestructive testing using angle beams and so need not be further described here. The S transducer method can have significant advantages over L mode in terms of efficiency of energy transmission and signal/noise ratio, for many of the practical materials used in pipe construction. Because refraction is to be obtained in a compound angle, the S transducer must be mounted to provide so-called vertically polarized components for both aspects of the refracted angle. For example, in FIG. 6A, transducers 48, if shear mode, should be oriented such that their direction of particle motion, if projected into the plane of the paper, makes a significant angle with respect to both centerlines.

I have also found that when the thickness of the pipe wall is less than about half a wavelength of the incident mode, the refraction limit calculated from Snell's Law can be avoided. Under this "thin wall" condition, refraction is still governed by Snell's Law, but with the important velocities being those in the external wedge and fluid. As an example, since ATJ graphite has a shear wave velocity of about 1500 meters per second, comparable to water and many other common liquids, the use of an external graphite wedge on a thin-walled pipe enables midradius interrogation of many liquids which would otherwise be impossible, when these liquids are confined to pipes having velocities in the L or S mode exceeding twice that in the liquid. This requirement is satisfied if the transverse particle motion is substantially in the plane of incidence. Thus, for example, S mode in an externally-mounted ATJ graphite wedge facilitates midradius interrogation of water, or similar-velocity fluids, in stainless steel, or similar-velocity pipes, at the compound angle which has a refracted component of 30° in the end view and a refracted component in the side view which may be much larger, for example, 45°, 60°, or even 75°.

Systems that are hybrids of those illustrated in the foregoing figures are shown in FIGS. 7A-7B and 8. The arrangement of FIGS. 7A and 7B is that of a clamp-on unit that incorporates the diametral-path reflector arrangement. The arrangement of FIG. 8, on the other hand, is a hybrid of a clamp-on system incorporating internal non-refracting wedges, flats, or cavities, the operation of which is described in the abovementioned U.S. patent application Ser. No. 629,870.

In FIGS. 7A and 7B the externally mounted transducers 52 and 54 are centered on diametral paths 56 and 58, respectively. A beam from transducer 52, after propagating along 56, is reflected by beveled reflector face 60 along oblique midradius flow-sensing path 62, thereby striking a second beveled reflector face 64 that reflects the beam along the second diametral path 58. After passing through the wall of the duct 10, the beam is received by transducer 54.

FIG. 8 shows views of partially cross-sectioned, partially-rotated portions of the flow cell duct 10. A first externally mounted transducer 66 mounted on a first wedge 68 transmits through either a parallel recessed duct face 70 or a parallel protruding face of a second wedge (not shown) along the nonrefracted midradius path 72. The beam may be received using symmetrically positioned components. Alternatively, the beam may be reflected by a beveled reflector face 74 along a dimetral path 76 to a second externally mounted received transducer 66a.

FIGS. 9A and 9B illustrate the preferred triple midradius design. The beam is introduced into and received from the fluid in the duct 10 using means (not shown) described above in relation to the previous figures. Additionally, however, this design utilizes the unique geometric property of the midradius chord whereby one such chord 78 if allowed to reflect internally in the circular duct in fact continues to propagate along a second such midradius chord 80, and so on. In this example the wave is received by an appropriate placed transducer (not shown) after three midradius chordal interrogations (78, 80, 82) have been accomplished. Their projection in the end view forms the inscribed equilateral triangle of FIG. 9A. Depending in part on the actual smoothness and curvature of the duct interior relative to the ultrasonic wavelength in the fluid, the multiple midradius chords may be reflected off the existing circular duct interior surface. Alternatively a simple right circular cylinder reflector 84 may be installed with its axis normal to the duct axis and its wetted end 86 substantially flush with the duct interior. Equivalently one could also produce a small flat in the duct interior, centered on the point where an incident midradius chord was to be reflected along a subsequent midradius chord.

Under the wavelength constraint $\lambda_{max} = (D_p \sin X)/16\sqrt{3}$ as well as under the effective diameter constraint $d_{max} = D_p/8$, we see that $d_{max}/\lambda_{max} = 2\sqrt{3}/\sin X$. Representative ratios for $d_{max}/\lambda_{max}$ are listed below as a function of X, along with corresponding values for the −3dB total beam spread angle, calculated by taking $d/\lambda = d_{max}/\lambda_{max}$ (Table IV).

Table IV

| X, deg | $d_{max}/\lambda$max | −3dB Total Beam Spread Angle, deg |
|---|---|---|
| 15 | 13.38 | 4 |
| 30 | 6.93 | 8 |
| 45 | 4.90 | 12 |
| 60 | 4.00 | 14 |
| 75 | 3.59 | 16 |

It is seen that under the given constraints, the beam spread increases as X increases. Consider now the particular case $X = 60°$, namely, where $d/\lambda = 4$ and the total beam spread angle between −3dB points, being approximately $\lambda/d$ radians, is about 14°. Since this large an angle might lead to some energy reaching the receiver transducer via an undesired path, simple methods of controlling the effective diameter are sought, whereby those rays which propagate at angles or along paths outside the intended path would be substantially rejected.

Arrangements to assist in maintaining an "effective" beam diameter not larger than $d$, despite far field spreading of ±7° are shown in FIG. 10A. In order to show four different arrangements in a single drawing, four transducers mounted in transducer ports 90 are illustrated in a single transverse section of a pipe segment 10. In any real system, of course, the sending and receiving transducers of a transducer pair would be spaced apart longitudinally of the pipe segment 10, as, for example, illustrated in FIGS. 4B, 5B, 6B, 7B, 8, and 9B.

At port 90a, the transducer 88a is recessed within the port away from the pipe segment 10 to prevent pipewall reflections from reaching the transducer. In port 90b transducer 88b is employed in conjunction with a filter plate 92 having a high sound speed relative to the fluid in pipe 10, to accomplish essentially the same result without recessing. Examples of suitable materials include alumina and carbide. Similarly, in port 90d transducer 88d is mounted adjacent the mouth of the port but a canopy 94 (also seen in FIG. 10B) projects into the conduit to have an effect similar to the recessing of transducer 88a. In port 90c transducer 88c is arranged to employ a composite of the other three arrangements shown in ports 90a, 90b, and 90d.

If a canopy is used it should not completely surround the beam as then it would obstruct the flow and thereby perturb the averaging property of the selected chord. The plate of relatively high sound speed acts as a totally reflecting mirror to rays incident beyond the critical angle, and as a narrowband mechanical filter suppressing rays at all angles of incidence other than normal incidence. The filter plate, if made of alumina, or certain carbides, nitrides or selected metals, would not only provide angular ray filtering and possibly spectral filtering, but also would provide increased wear resistance, as is important in applications where the fluid is a slurry or other abrasive-containing medium.

It will also be understood by those skilled in the art that conventional provisions may be made for acoustical isolation of the transducers. Such acoustical isolation may be more important when used in conjunction with the transducer placement required by the present invention than is the case with more conventional transducer placements since the path length along the pipe segment wall 10 between transducers may be shorter than with other arrangements.

Figure 11:
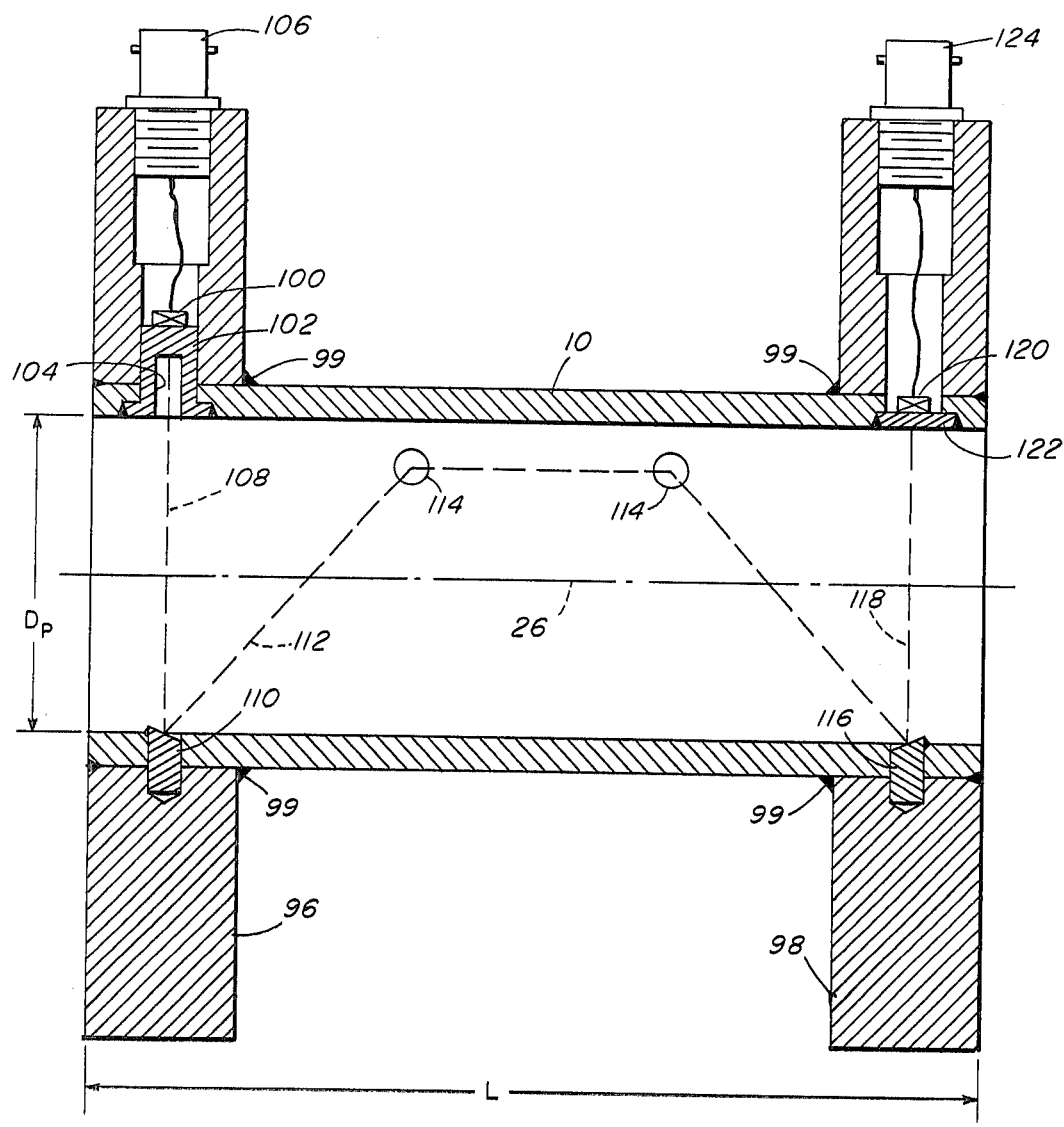
FIG. 11 is a longitudinal section of a spoolpiece-type flowmeter cell incorporating features of the present invention.
Figure 12:
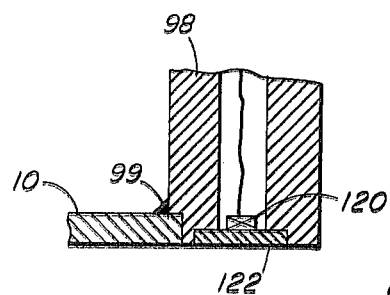
FIG. 12 is a fragmentary view of an alternative spoolpiece-type flowmeter cell.

One preferred arrangement for achieving acoustic isolation of the transducers is shown in FIG. 11, which illustrates a complete flowmeter cell of the spoolpiece type. The cell consists of flanges 96 and 98 welded (as at 99) to a pipe segment 10. The flanges 96 and 98 are designed to mate with flanges secured to the conduit segments between which the flowmeter cell is to be inserted. To achieve acoustic isolation of a transmitting transducer 100, it is mounted in a cavity within the flange 96 supported on a holder 102 disposed within that cavity and itself defining a recess 104. The transducer is electrically connected to an exterior connector 106 for making electrical connections.

The acoustic beam is emitted from the cavity 104 along a diametral path 108 to a reflector 110 that initiates a sequence of three tilted midradius path segments defining the interrogation path 112. Intermediate reflectors 114 direct the beam along successive segments of the interrogation path to a receiving reflector 116 where the beam is reflected to a diametral path 118 to be received at a receiving transducer 120 supported on a optionally partly serrated disc 122. The transducer 120 is electrically connected to an external connector 124.

As will be evident to those skilled in the art, the mounting of the transducers within the end flanges 96, 98 coupled with the physical isolation of the transducers even from those flanges (i.e., the use of holder 104 with transducer 100 and the use of disc 122 with transducer 120), result in a practical and convenient arrangement for acoustically isolating the transducers. Furthermore, the flanges are easily accessible internally, enabling convenient internal machining and internal assembly. When the inscribed equilateral triangle triple midradius path is combined with diametral entry and exit, said entry and exit paths can easily both lie in the same plane. (Diametral ports would typically be oriented with their axes radial and generally centered between the flanges' bolt holes, or in the solid portion of a double-thick flange containing blind tapped (not shown) holes instead of the usual drilled-through bolt holes.) Proper installation of the spoolpiece assures that the plane of the diametral transducers is the horizontal plane, in most cases. This avoids the potential accumulation of gas or air bubbles or sediment in the transducer ports.

Flange-mounted midradius transducers provide for a relatively short overall cell length. Even for triple 45° paths, overall length typically would not exceed $3D_p$. The short length saves material, thereby saving volume, weight and costs. The flange mounting simplifies machining (e.g. most operations can be executed in one setup by boring from the transducer port side.) The last two features are further recognized when one observes that the additional pair of flanges usually required for pipe-mounted transducers normally located approximately midway between the end flanges, are in fact eliminated, along with the associated oblique drilling, contouring and welding common in conventional ultrasonic flowmeters.

It will be understood that the foregoing illustrative examples of flowmeter cells constructed in accordance with the present invention do not exhaust the possibilities of employing midradius chordal interrogation paths for ultrasonically determining flow parameters over wide range of flow conditions. Accordingly, other embodiments are within the scope of the invention and the following claims.

What is claimed is:

1. An ultrasonic flowmeter cell comprising a body comprising a circular cross section duct segment having an inside diameter of D, and
a pair of transducers mounted on said body and communicating with each other via a directional beam having an effective diameter, $d$, smaller than D at a wavelength, $\lambda$, that is smaller than $d$;
said body and transducers defining an acoustic flow sensing path between the transducers, said path including at least one chord located substantially at the midradius of said duct segment, the projection of said chord on a reference plane parallel thereto and including the axis of said duct segment being inclined at an angle, X, with respect to said axis; and
wherein $D/d$ is greater than approximately 8 and $\lambda$ is smaller than about 0.036 D sin X.

2. The ultrasonic flowmeter of claim 1 where X lies in the range of about 15° to about 75°.

3. The ultrasonic flowmeter of claim 1 wherein said path further includes at least 1 diametral path segment.

4. The ultrasonic flowmeter cell of claim 1, and where the flow-sensing path includes three sequential path segments each being an oblique midradius chord whose axial projection forms a leg of an equilateral triangle inscribed in the circular duct.

5. The ultrasonic flowmeter cell of claim 1 wherein said transducers are of the type having a near field, each transducer being operated in the near field of the other.

6. The ultrasonic flowmeter of claim 1 where triple transits are suppressed by operating each transducer in the far field of the other transducer.

7. An ultrasonic flow metering system comprising the cell of claim 1 in combination with electronic transmitting, receiving, timing and signal processing means operative to multiply the flow velocity, $V_c$, line-averaged along said midradius chord by a constant, K, equal to the ratio of the average flow velocity to said line-averaged flow velocity, said constant being substantially independent of Reynolds numbers at least in the laminar range below about 2000 and in the turbulent range above about 4000, for Newtonian fluids in which the flow distribution is variable.

8. Apparatus as in claim 7 wherein said constant has a value of approximately unity.

9. The ultrasonic flowmeter of claim 7 for use with turbulent flow, wherein the nominal midradius chord is centered exactly on the midradius and said constant K is about 0.9961.

10. The ultrasonic flowmeter of claim 7 for use with turbulent flow, wherein the nominal midradius chord is centered essentially on a normalized radius $r_n = 0.520$, and wherein said constant K is unity.

11. The ultrasonic flowmeter of claim 7 wherein said chord is located at radius value of substantially $r_n = 0.497$ and said constant K is about 0.996.

12. The ultrasonic flowmeter of claim 7 wherein said chord is located at radius value of substantially $r_n = 0.500$ and said constant K is aout 0.998.

13. The ultrasonic flowmeter of claim 1 further including end flange portions secured to said duct segment to provide a spoolpiece-type flowmeter cell, a first of said transducers mounted in a first end flange and a second of said transducers mounted in a second end flange.

14. The ultrasonic flowmeter of claim 13 wherein each of said transducers is supported in its respective flange by a member disposed intermediate of the transducer and the flange.

15. The ultrasonic flowmeter of claim 1 further including means for controlling beam width adjacent each transducer of said pair when it operates as a receiving transducer.

16. The ultrasonic flowmeter of claim 15 wherein said means comprise a recessed mounting of said receiving transducer.

17. The ultrasonic flowmeter of claim 15 wherein said means comprise a plate of high sound speed relative to the fluid in the duct segment.

18. The ultrasonic flowmeter of claim 15 wherein said means comprise a canopy disposed to intercept divergent beam portions.

19. The ultrasonic flowmeter of claim 1 wherein said transducers are externally mounted on said body.

20. The ultrasonic flowmeter of claim 19 wherein said transducers operate in the shear mode.

21. The ultrasonic flowmeter of claim 1 wherein said duct segment has hydraulically smooth interior walls.

22. The method of measuring ultrasonic response characteristics of a fluid medium flowing within a duct having a circular internal cross section comprising the steps of
transmitting a beam of ultrasonic energy into said flowing material from a first position on the duct wall located on a midradius chord of said circular cross section,
directing said beam along the entire length of said midradius chord,
measuring at a second position ultrasonic energy transmitted through said fluid medium;
said beam following a path from said first position to said second position that includes said midradius chord; and
directing said beam along at least one other midradius chord prior to said measuring step.

23. The method of claim 22 wherein said beam traverses three midradius chords prior to said measuring step.

* * * * *